US009965935B2

(12) United States Patent
Palmer et al.

(10) Patent No.: US 9,965,935 B2
(45) Date of Patent: May 8, 2018

(54) ALARM DEVICE SYSTEM WITH SIMULTANEOUS AC/DC POWER SOURCE

(71) Applicants: Preston Palmer, Gilbert, AZ (US); Wesley Palmer, Mesa, AZ (US); Larkin Palmer, Payson, AZ (US)

(72) Inventors: Preston Palmer, Gilbert, AZ (US); Wesley Palmer, Mesa, AZ (US); Larkin Palmer, Payson, AZ (US)

(*) Notice: Subject to any disclaimer, the term of this patent is extended or adjusted under 35 U.S.C. 154(b) by 0 days. days.

(21) Appl. No.: 15/167,686

(22) Filed: May 27, 2016

(65) Prior Publication Data

US 2016/0335867 A1  Nov. 17, 2016

Related U.S. Application Data

(63) Continuation-in-part of application No. 14/557,362, filed on Dec. 1, 2014, which is a continuation-in-part of application No. 13/407,443, filed on Feb. 28, 2012, now abandoned.

(60) Provisional application No. 61/464,115, filed on Feb. 28, 2011.

(51) Int. Cl.
| G08B 17/10 | (2006.01) |
| H02S 40/38 | (2014.01) |
| H02J 3/02 | (2006.01) |
| H02J 9/06 | (2006.01) |
| G08B 17/113 | (2006.01) |
| H02J 7/35 | (2006.01) |

(52) U.S. Cl.
CPC ............ *G08B 17/10* (2013.01); *G08B 17/113* (2013.01); *H02J 3/02* (2013.01); *H02J 9/061* (2013.01); *H02S 40/38* (2014.12); *H02J 7/35* (2013.01); *Y02B 10/72* (2013.01); *Y02E 10/566* (2013.01); *Y10T 29/49117* (2015.01)

(58) Field of Classification Search
CPC ................ G08B 17/10; H02J 7/00; H02J 3/02
USPC ........................................................ 307/64
See application file for complete search history.

(56) References Cited

U.S. PATENT DOCUMENTS

| 3,644,912 A | 2/1972 | Allen | |
| 4,199,754 A * | 4/1980 | Johnson | ............... G08B 29/181 340/332 |

(Continued)

OTHER PUBLICATIONS

International Searching Authority, Written Opinion of the International Searching Authority for PCT/US2015/061957, dated Feb. 23, 2016, pp. 1-15, Virginia, USA.

*Primary Examiner* — Rexford Barnie
*Assistant Examiner* — Joseph Inge
(74) *Attorney, Agent, or Firm* — Schmeiser, Olsen & Watts, LLP

(57) ABSTRACT

Disclosed is an alarm device system with simultaneous AC/DC power. The system includes of one or more alert devices wired into a dedicated circuit with a single location housing a DC power backup source, such as a rechargeable DC battery. The DC power backup source may be replaceable or rechargeable with DC current from an AC-DC transformer-rectifier, a photovoltaic cell, or other means. A dedicated circuit is energized with a composite current to provide continuous, uninterrupted DC backup power, upon which line AC is superimposed. AC and continuous DC backup are simultaneously provided to a system of detection and alert devices, such as smoke alarms, electrically coupled to the dedicated circuit.

6 Claims, 8 Drawing Sheets

(56) References Cited

U.S. PATENT DOCUMENTS

| | | | |
|---|---|---|---|
| 5,365,145 A | * | 11/1994 | Fields .................... H02J 9/02 |
| | | | 307/66 |
| 5,640,058 A | | 6/1997 | Calvo |
| 5,929,781 A | * | 7/1999 | Vosika ................ G08B 29/126 |
| | | | 315/134 |
| 5,973,603 A | | 10/1999 | Judy |
| 7,576,659 B2 | | 8/2009 | Lax |
| 2005/0178539 A1 | | 8/2005 | Rotta et al. |
| 2005/0195089 A1 | | 9/2005 | Shomali |
| 2006/0170542 A1 | | 8/2006 | Schoor |
| 2006/0265195 A1 | | 11/2006 | Woodard et al. |
| 2008/0266121 A1 | | 10/2008 | Ellul |
| 2011/0210694 A1 | * | 9/2011 | Uehashi .................... H02J 3/32 |
| | | | 320/101 |
| 2012/0217799 A1 | | 8/2012 | Palmer et al. |
| 2015/0084780 A1 | | 3/2015 | Palmer et al. |

\* cited by examiner

ALARM DEVICE SYSTEM WITH SIMULTANEOUS AC/DC POWER SOURCE

CROSS REFERENCE TO RELATED APPLICATION

This application is a continuation-in-part of U.S. patent application to Preston Palmer et al. entitled "CENTRAL BATTERY INTERCONNECTED SMOKE DETECTOR SYSTEM WITH SINGLE WIRE AC AND DC PASS-THROUGH RELAY," Ser. No. 14/557,362, filed Dec. 1, 2014, which is in turn a continuation-in-part of U.S. patent application to Preston Palmer et al. entitled "CENTRAL BATTERY INTERCONNECTED SMOKE DETECTOR SYSTEM WITH SINGLE WIRE AC AND DC PASS-THROUGH RELAY," Ser. No. 13/407,443, filed Feb. 28, 2012, which claims priority to the U.S. Provisional patent application to Preston Palmer et al. entitled "CENTRAL BATTERY INTERCONNECTED SMOKE DETECTOR SYSTEM WITH SINGLE WIRE AC AND DC PASS-THROUGH RELAY," Ser. No. 61/464,115, filed Feb. 28, 2011 the disclosures of which are hereby incorporated entirely herein by reference.

BACKGROUND OF THE INVENTION

Technical Field

This invention relates to alert device systems with dual power sources. In particular, embodiments of the invention relate to a system comprising alarm devices receiving primary alternating current superimposed on a back-up direct current power source as a composite current through a dedicated wiring circuit.

State of the Art

Systems of alert devices installed in residential, business, and public buildings are designed to warn occupants of a building structure of the presence of dangerous conditions, including fire, the presence of carbon monoxide or other toxic gases, weather emergencies, other public emergencies, and the like. Conventional smoke detectors are representative of such alert devices.

A reliably functioning system of smoke detectors in a home or commercial building saves lives. In the U.S., many states require smoke alarms/detectors in both residential and commercial buildings, particularly in new construction. Current smoke detector alarm systems vary in the manner through which the individual detectors are interconnected and powered. Most commonly, smoke detectors are wired into an isolated alternating current ("AC") power circuit ("dedicated circuit") in a residential or commercial building to provide a reliable, continuous source of power. In the event of a power failure wherein the dedicated circuit is no longer energized with an external current from a remote AC power source, a conventional DC battery within each detector provides backup power to the device. This generally works fine, unless these backup-power batteries fail or are disconnected. According to the National Fire Protection Association ("NFPA"), almost two-thirds of home fire deaths from 2000-2009 resulted from fires in homes without smoke detector alarms or in homes where smoke detector alarms were non-functioning. The NFPA reports that eighty percent of smoke alarm failures during this period arose from a missing or disconnected battery, dead or discharged battery, or line AC power failure/shut-off/disconnect. When the voltage of a backup direct current ("DC") battery in an individual smoke detector weakens, a typical detector emits an audible alarm consisting of regular, loud beeps or chirps, alerting the building's occupant to replace the old, discharged battery with a fresh one.

This system of using replaceable batteries as backup power for individual smoke detectors, however, is flawed. A chirping alert device, such as a smoke detector, is widely perceived as a nuisance, particularly when the chirping begins at night when building occupants are sleeping. Detection and alert devices are usually mounted on the ceiling, at best requiring a ladder or large stepstool to access the detector and change the battery. At worst, the alert device may be mounted on a high ceiling, as much as thirty feet from the floor. Access to ceiling-mounted detection and alert devices is often troublesome and sometimes dangerous. The NFPA observes that "when smoke alarms should have operated but did not do so, it was usually because batteries are missing, disconnected or dead. People are most likely to remove or disconnect batteries because of nuisance activations. Sometimes, the chirping to warn of a low battery is interpreted as a nuisance alarm."

Accordingly, what is needed is a alert device that simultaneously: 1) provides a reliable centrally located backup power source to an existing interconnected system of detection and alert devices in a residence or commercial building; 2) monitors the functionality of each individual emergency detection and alert device.

DISCLOSURE OF EMBODIMENTS OF THE INVENTION

This invention relates to alert device systems. In particular, as mentioned herein above, embodiments of the invention relate to a system comprising alarm devices receiving primary alternating current superimposed on a back-up direct current power source as a composite current through a dedicated wiring circuit. The system may comprise any type of alarm device with a primary conventional alternating current ("AC") power source with circuitry for low-voltage direct current ("DC") backup power. An excellent non-limiting example of such a device is a conventional smoke detector wired to residential 110-120 volt AC line voltage and comprising a terminal within the device housing for a nine-volt battery.

Disclosed is an alarm device system comprising an alarm device electrically coupled to a dedicated circuit; an alternating current source coupled to the dedicated circuit; and a first direct current source located remote from the alarm device coupled to the dedicated circuit; wherein the dedicated circuit conducts a composite current comprising the direct current and an alternating current from the alternating current source to the alarm device.

In some embodiments, the first direct current source is a battery. In some embodiments, the battery is a rechargeable battery. In some embodiments, the first direct current source is a photovoltaic cell.

In some embodiments, the alarm device system further comprises a low voltage controller electrically coupled between the first direct current source and the dedicated circuit; and a second direct current source coupled to the low voltage controller, wherein the low voltage controller conducts a charging current to the rechargeable battery by selecting the second direct current source. In some embodiments, the alarm device system further comprises an alternating current to direct current transformer electrically coupled to the alternating current source and the low voltage controller, wherein the second direct current source is the transformer.

In some embodiments, the low voltage controller comprises a first relay electrically coupled to the rechargeable battery and a plurality of second direct current sources, wherein the first relay conducts the charging current to the rechargeable battery by selecting from a plurality of second direct current sources. In some embodiments, the plurality of second direct current sources comprises the photovoltaic cell and an alternating to direct current transformer electrically coupled to the alternating current source and the low voltage controller.

In some embodiments, the alarm device system further comprises a plurality of alarm devices electrically coupled to the dedicated circuit, wherein the low voltage controller responds to one activated alarm device by activating the plurality of alarm devices. In some embodiments, the alarm device system further comprises a system panel electrically interposed between a service entrance panel and the dedicated circuit. In some embodiments, the alarm device is coupled to a fire alarm.

Disclosed is an alarm device comprising a case enclosing an alternating current circuit and a direct current circuit; and a composite current coupled to the alternating current circuit and the direct current circuit, comprising an alternating current and a direct current, wherein the alternating current powers the alarm device under a condition wherein the composite current is present; and the direct current powers the alarm device under a condition wherein the alternating current of the composite current is absent.

Disclosed is a method of forming an alarm device system comprising installing an alarm device in a building; and electrically coupling an alternating current source of an alternating current, a first direct current source of a direct current, and an alarm device on a dedicated circuit, wherein the dedicated circuit conducts a composite current comprising the alternating current and the direct current to the alarm device using a single conductor.

In some embodiments, the method further comprises electrically coupling a low voltage controller between the first direct current source and the dedicated circuit; and electrically coupling a rechargeable battery to the low voltage controller, wherein the low voltage controller conducts a charging current to the rechargeable battery by selecting a second direct current source from a plurality of second direct current sources. In some embodiments, the method further comprises electrically coupling an alternating-to-direct current transformer between the alternating current source and the low voltage controller; and electrically coupling a photovoltaic cell to the low voltage controller, wherein the low voltage controller selects the charging current from between the transformer and the photovoltaic cell.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

Figure 1:
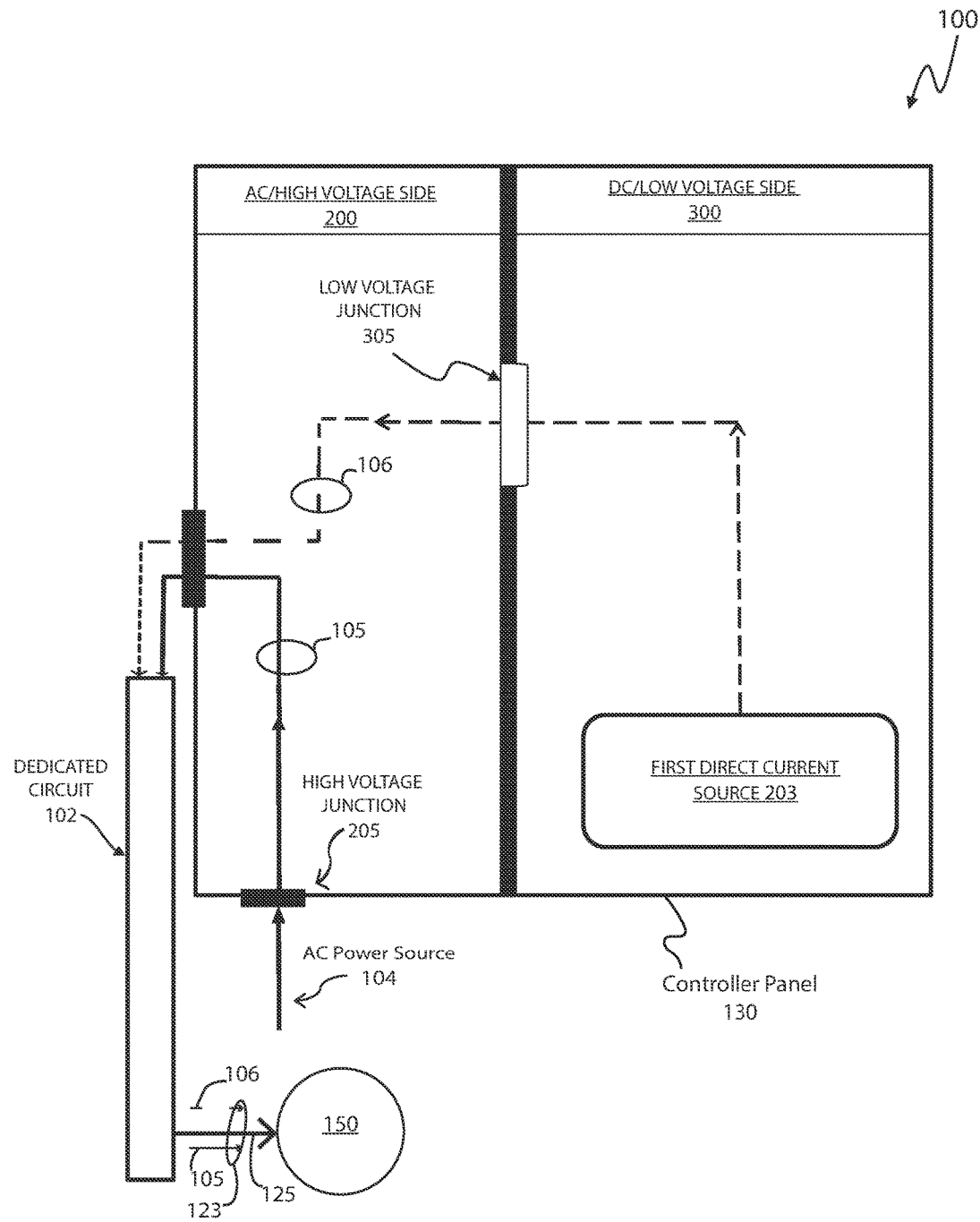
FIG. 1 is a schematic view of a battery interconnected alert device system 100.

As discussed above, the disclosed invention relates to an alarm device system with a remotely located DC battery power backup to alert persons to the presence of a variety of potentially dangerous situations. In the event of an AC power failure, the system transmits power from a reliable, continuous DC backup source to one or a plurality of alarm devices electrically coupled to a dedicated circuit, eliminating the need for a DC battery within each individual detection and alarm device.

In the context of the disclosures herein, "alarm device" broadly means any individual device which provides an alert to a person or persons in proximity to the device. The alert may be but is not limited to an auditory alert, a visual alert, a vibrational alert, or any combination of any or all of an auditory, visual, or vibrational alert. The alarm device may additionally but need not necessarily comprise a detection device, such as a smoke detector, for example. Throughout this disclosure, "alarm device" is used synonymously with "alert device," "detection device," "detection and alert device," and "alert and detection device."

Existing detection and alert device systems use community-distributed AC power or "line power." There are, however, many reasons this line AC power commonly fails, necessitating a backup power source for the detection and alert device. Examples of AC power failure include unintentional physical damage to power lines or other components of the community power distribution system, such as from a severe weather event or power station generator failure. Additionally, service may be intentionally disconnected, such as for non-payment or following a bank foreclosure, or abandonment of the property. Accordingly, commercially available alert devices generally employ a nine-volt or similar DC battery housed within each individual alert device unit as a back-up source of power in the event AC power fails.

This system of utilizing a different battery in each individual alert device, although ubiquitous, is inadequate. When an individual device's battery is charged and functioning, the backup system works well. Problems arise, however, when a battery ages, loses its charge, and eventually fails. When the battery voltage drops below a given level, a conventional alert device will emit a periodic audible alarm, such as a loud "chirp." If the building housing the detector is occupied, this alarm is usually effective at getting the occupants' attention. When the occupant or owner is severely hearing impaired, an audible alarm is not heard. Either way, a responsible occupant or building owner will respond by simply replacing the old, discharged battery with a new, fresh battery.

All too often, however, this does not happen for two general reasons. First, changing the battery in even one standard alert device is inconvenient. Devices are usually mounted on a ceiling and require at least a step-stool, if not a tall ladder, for access. Even a small residence will have three or four alert devices; a large house may have up to a dozen or more. Therefore, a typical building will house multiple alert devices in difficult-to-access locations, each with a different battery which will fail and require replacement at a time different from all the other batteries. Some occupants change each battery as it fails. Others change all the individual device batteries when one device battery fails, wherein some batteries are discarded prematurely creating waste and expense. To avoid future inconvenience, however, many occupants respond to an alert device's battery-failure alarm by disabling or removing all of the similar individual alert devices throughout the building.

Second, line AC power may be absent in a vacant building for weeks or months. Some buildings are unoccupied for an extended period of time. Many homes and buildings stand vacant for months or years awaiting sale, or while awaiting renovation or restoration. Buildings unoccupied for a lengthy period often have no AC electrical service. A great many of these buildings are not regularly visited or properly attended. If functioning alert devices are present in these buildings, the batteries all fail after an extended period and the building is left without a functioning detection and alert device system.

Embodiments of the disclosed invention solve these and other problems by providing backup DC power on the same dedicated building electrical circuit which provides line AC power to one or more alert devices. In some embodiments, the AC line power is superimposed in the backup DC power as a composite current. The backup DC power, in some embodiments, comprises regenerative DC power through the use of a DC battery recharged by one or more secondary DC sources, such as a photovoltaic cell, a wind turbine, an AC to DC electrical transformer-rectifier, and the like. In some embodiments, multiple secondary DC sources are used, increasing reliability of the system by creating redundancy of the backup DC power sources. The use of a composite current in the dedicated circuit simplifies the electrical circuitry thereby increasing reliability by eliminating the need for relays and additional components to isolate the AC from the DC power. As a result, embodiments of the disclosed invention increase reliability of alarm devices, such as smoke alarms and the like, by eliminating the need to monitor and regularly change batteries housed in detection and alert devices located in hard-to-reach locations, providing an essentially never-ending supply of DC backup power through multiple regenerative sources. The disclosed invention, therefore, provides a continuous reliable source of backup DC power for detection and alert devices wired into a dedicated circuit.

Disclosed is an alarm device system with a simultaneous AC/DC power source. What immediately follows is a general overview of the system. Afterward, additional details are provided in a detailed description of each of the various drawing figures.

In some embodiments, as shown in FIG. 1, the system generally comprises an AC power source 104, a first DC source 203, a dedicated circuit 102, and a detection and alert device 150. Detection and alert device 150 is powered by an external current conducted by dedicated circuit 102. Dedicated circuit 102, in some embodiments, is a wiring circuit present within a building structure, whether a commercial or a residential building or other structure, which is electrically coupled to alarm devices and electrically isolated from all other voltage loads and electrical currents in the building structure. Many building structures already comprise a dedicated circuit coupled to a plurality of smoke detectors, as one example of a detection and alert device. Currently, however, a dedicated circuit in an existing building is only coupled to and conducts current from an AC source. Such dedicated circuits are not coupled to and, therefore, do not conduct current from a DC source. Detection and alert device 150, being electrically coupled to dedicated circuit 102 by a conductor 125 which may conduct a composite AC/DC depending whether the external current is AC or DC.

AC power source 104, first DC source 203, and dedicated circuit 102 are coupled to one or a plurality of detection and alert devices 150. AC power source 104, in some embodiments, derives from a conventional power generation and distribution system. For purposes of this disclosure, the term "line voltage" is used synonymously with AC power source 104. Line voltage for a residential building in the United States, for example, may be between 110-120 volts or about 220 volts. First DC source 203, in some embodiments, is a rechargeable battery 310 (shown in FIG. 2, FIG. 3, and FIG. 4.) In some embodiments, first DC source 203 is a non-rechargeable battery.

In some embodiments, a composite current 123, as shown in FIG. 1, energizes alert device 150. A common conductor 125 carries a composite current 123 comprising an alternating current 105 and a first direct current 106. When line voltage is present, AC electricity from AC power source 104 energizes dedicated circuit 102 with alternating current 105, superimposed in direct current 106, in some embodiments. When AC power source 104 is absent, such as during a power failure or disconnected service, DC source 203 continues to energize one or more detection and alert devices 150 electrically coupled to dedicated circuit 102. When AC power source 104 is absent, DC power from first DC source 203 energizes detection and alert devices 150 through the same physical wiring—dedicated circuit 102—as is energized with AC from alternating current power source 104 when line voltage is present. In this manner, some embodiments of the invention allow for a single-battery source of back-up DC power to one or a plurality of detection and alert devices 150, eliminating the need to house a battery within each individual detection and alert device 150.

A central battery AC/DC controller panel 130, in some embodiments, is located in a convenient location in or immediately outside the building. It is convenient to install a controller panel 130 adjacent or near the building's traditional service-entrance electrical panel. Controller panel 130, in some embodiments, houses first DC source 203. Controller panel 130, in some embodiments, receives AC power source 104 via the building's service entrance panel, typically a circuit breaker box. Controller panel 130, in some embodiments, outputs AC power or direct current back to the service entrance panel to energize dedicated circuit 102. In some embodiments, controller panel 130 outputs composite current 123 to the service entrance panel to energize dedicated circuit 102. Because a first DC source 203, such as a rechargeable DC battery in some embodiments, is housed in a convenient location such as near the service entrance panel within controller panel 130, access to first DC source 203 for service or replacement is safe and uncomplicated. In some embodiments, controller panel 130 is mounted at standing-eye-level, so that a stool, ladder, or the like is not required to access first DC source 203. Therefore, in some embodiments wherein first DC source 203 comprises a rechargeable DC battery, the need for multiple periodic battery changes is eliminated. Some embodiments additionally comprise one or more additional DC sources, such as a photovoltaic cell, a wind turbine, other source of regenerative power, and/or AC power source 104 current modified by an AC/DC transformer, for example.

FIG. 1 shows an example embodiment of an alarm device system with simultaneous AC/DC power source 100. System 100 comprises controller panel 130 with an AC/high voltage side 200 and a D/C low voltage side 300, dedicated circuit 102, and detection and alert device 150. In FIG. 1, and other drawing figures, solid lines connecting components represent electrical connections conducting AC power and dashed lines connecting components represent electrical connections conducting DC power. Arrows on the ends and/or mid-segments of solid and dashed electrical connection lines represent the direction of current flow. In the embodiment shown in FIG. 1, alternating current from AC power source 104 enters an AC/high voltage side 200 of system 100 and is electrically coupled to dedicated circuit 102. First DC source 203, in some embodiments, is housed inside DC/low voltage side 300 of system 100 and is discussed in detail below.

In some embodiments, AC/high voltage wiring is physically separated from DC/low voltage wiring within controller panel 130 for safety reasons. In the United States, line AC voltage is 220 volts, stepped-down to 110 volts at the service entrance panel. Contact with high voltage AC power from a typical 110 volt AC power source 104 may, under certain conditions, result in electrocution. Further, the need to access any of system 100's components located in AC/high voltage side 200 should be very infrequent. Conversely, contact with relatively low voltage, such as DC power from a typical 12 volt first DC source 203, in some embodiments, should almost never result in serious injury. Additionally, in some embodiments, first DC source 203 will periodically need replacement, such as when a non-rechargeable DC battery or a rechargeable DC battery 310 comprises first DC source 203. Therefore, controller panel 130, in some embodiments, is constructed so as to physically isolate the relatively safe currents present in DC/low voltage side 300 from the more hazardous currents present in AC/high voltage side 200.

In the embodiments of system 100 shown in FIG. 1, and some other embodiments, wiring carrying DC power from first DC source 203 passes from DC/low voltage side 300 to AC/high voltage side 200 through a low voltage junction 305. Low voltage junction 305, in some embodiments, is any one of a variety of pass-through conduits commercially available and known to those in the art electrically insulated from contact by a physical partition between AC/high voltage side 200 and DC/low voltage side 300 of controller panel 130. Similarly, AC power from AC power source 104 enters AC/high voltage side 200 through a high voltage junction 205. High voltage junction 205, in some embodiments, is any one of a variety of pass-through conduits commercially available and know to those in the art electrically insulated form contact with the physical outer wall of controller panel 130

Dedicated circuit 102 is an electrical circuit electrically coupled to alert device 150 or an interconnected plurality of alert devices 150, in some embodiments. Installation of a dedicated circuit interconnecting smoke detectors, as a non-limiting example of alarm device 150 has been widely adopted in residential building codes throughout the U.S. since written into the National Fire Alarm Code in 1989. Therefore, dedicated circuit 102 is generally present in all newer residential buildings and known to those with skill in the art. Alarm device 150 is compatible with a conventional dedicated circuit, such as dedicated circuit 102 shown in FIG. 1, in some embodiments. An existing dedicated circuit installed in a building structure conducts either AC or DC, such as from AC power source 104, first DC source 203, or a second direct current 302 (See FIG. 2) to alarm device 150. Moreover, an existing installed dedicated circuit conducts composite current 123.

When AC power source 104 is absent, DC power from first DC source 203 energizes alert devices 150 through the same physical wiring—dedicated circuit 102—as is energized with AC from AC power source 104 when line voltage is present. Although dedicated circuit 102 is energized with AC power when AC power is available, dedicated circuit 102 is able to conduct sufficient DC to energize a plurality of detection and alert devices 150 along the limited lengths of wire present in a residential or small commercial building without a substantial voltage drop across the internal electrical resistance in the wires of dedicated circuit 102. Further, because dedicated circuit 102, in some embodiments, is only coupled to alert devices 150 and, in some embodiments, alarm switch 403, electrical resistance is minimized and available voltage is conserved. Therefore, when line AC is not available, the DC component of composite power 123 from first DC source 203 remains to provide adequate DC power for energizing a plurality of alarm devices 150 electrically coupled to dedicated circuit 102 without a drop in voltage below the operational threshold voltage of alarm devices 150.

Figure 2:
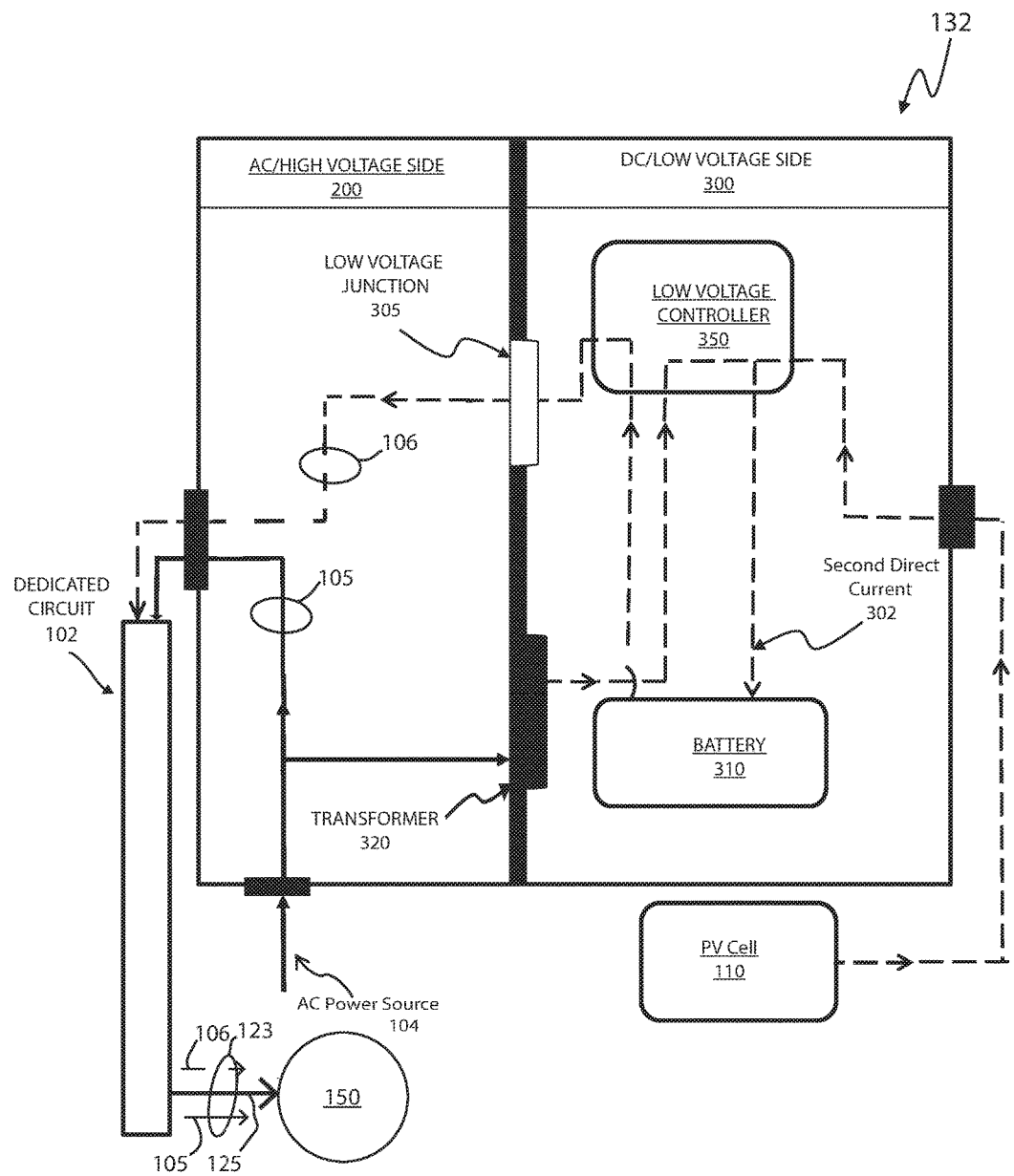
FIG. 2 is a schematic view of a battery interconnected alert device system 100.

FIG. 2 shows an example embodiment of alarm device system with simultaneous AC/DC power source 100. In the embodiment shown in FIG. 2, and in some other embodiments, a battery 310 is first DC source 203. Battery 310, in some embodiments, is a non-rechargeable DC battery, such as a 12 volt dry cell "lantern" battery. In some embodiments, battery 310 is two 6 volt dry cell batteries electrically connected in series to deliver 12 volts. In still other embodiments, battery 310 is some other non-rechargeable battery or a combination of batteries such that the total available voltage and current provided by battery/batteries 310 result in a first DC source of sufficient voltage and available current to power the building's system of alert devices 150 interconnected on dedicated circuit 102. Some advantages of using a non-rechargeable battery 310 as first DC source 203 are low cost and a more simple design. One disadvantage is the limited useful life of a non-rechargeable battery before it needs to be replaced. Another disadvantage is failure of a non-rechargeable battery 310 as available backup DC power (i.e., first DC source 203) to alarm device system with simultaneous AC/DC power source 100 in a building which has been abandoned or otherwise unattended for a long period of time.

In some embodiments, battery 310 is a rechargeable battery. The use of a rechargeable battery 310 versus a non-rechargeable battery 310 is advantageous in some embodiments of system 100 which provide an automatic recharging means, such as the non-limiting example embodiment of system 100 shown in FIG. 2 and discussed further herein below. A rechargeable battery has a longer useful life than a non-rechargeable battery. In some embodiments of system 100 wherein battery 310 comprises a rechargeable battery, additional components comprising an automatic recharging means provide for a first DC source 203, such as a rechargeable battery 310 for example, to provide potentially years of continuous DC power to alert devices 150 in a completely unattended building wherein AC power source 104 is continuously unavailable, or unavailable for extended periods. In some embodiments, rechargeable battery 310 is a UB 1250 12 volt sealed lead-cell battery. This is by way of example only. In some embodiments, battery 310 is a rechargeable lead cell, nickel-cadmium, lithium hydride, or any other suitable battery, whether rechargeable or not. Many other suitable examples are commercially available and known to those skilled in the art.

FIG. 2 additionally shows a means for recharging battery 310 of system 100 with a second DC 302. In the embodiment of system 100 shown in FIG. 2 and in some other embodiments, DC/low voltage side 300 further comprises a low voltage controller 350, a transformer 320, and a photovoltaic ("PV") cell 110. In this embodiments, low voltage controller 350 selects second DC 302 from a plurality of sources, such as PV cell 110 or AC power source 104 modified by transformer 320, for example. In the example embodiment shown in FIG. 2, low voltage controller 350 is electrically coupled to PV cell 110, transformer 320, and battery 310. In some embodiments, low voltage controller 350 selects second DC 302 from a second DC source, such a PV cell 110 or transformer 320, for example, to recharge battery 310.

In some embodiments, low voltage controller 350 selects a DC charging current output from a plurality of available second DC 302 inputs. In the example embodiment shown by FIG. 2, low voltage controller 350 conducts DC from transformer 320 to charge battery 310 under conditions where AC power source 104 is present. Under conditions where AC power source 104 is not present, such as a power outage or disconnection of service, low voltage controller 350 conducts DC from PV cell 110, provided that DC is available from PV cell 110. In some embodiments, low voltage controller 350 comprises a battery charging means to regulate second DC 302 delivered to battery 310 by monitoring the charge state of battery 310. Such a charging means functions to maximize the charge status and extend the useful life of battery 310. Consequently, battery 310 remains fully charged by low voltage controller 350 under conditions wherein either AC power source 104, sunlight to power PV cell 110, or both are available in some embodiments, including the embodiment shown in FIG. 2.

Transformer 320, in some embodiments, is an AC/DC step-down transformer operating between 110 volt AC and 12 volt DC voltages. Transformer 320 converts 110 volt AC line input power to 12 volt DC power for recharging battery 310, in some embodiments. Transformer 320 may be selected from a variety of commercially available AC/DC step-down voltage transformers to operate between different ranges of AC and DC voltages and amperages depending upon the characteristics of AC power source 104 and the parameters under which low voltage controller 350 recharges battery 310. These parameters, in turn, depend upon the charging requirements of battery 310.

In some embodiments, PV cell 110 is a photovoltaic cell electrically coupled to low voltage controller 350. PV cell 110 provides threshold DC amperage at 12 volts to generate a charging current 302 for battery 110 under conditions where PV cell 110 is exposed to adequate incident sunlight. Many suitable examples of photovoltaic cells for use as PV cell 110 are commercially available and may be used in various embodiments of the invention. In some embodiments, PV cell 110 is a relatively small photovoltaic cell, 12 inches to 18 inches by 24 inches, for example, which is secured in a sunlit indoor location, such as an un-shaded southern-facing window, to deter theft or vandalism, in some embodiments. In some embodiments, PV cell 110 is secured in an outdoor location. In some embodiments, PV cell 110 is mounted on the outside of controller panel 132. In some embodiments, PV cell 100 is secured to the building's outer wall, a rooftop, a stand-alone mounting pole, a fence, an out-building or any other suitable outdoor location exposed to sunlight.

In some embodiments (not shown in the drawing figures), first DC source 203 comprises PV cell 110. In these and some other embodiments, low voltage controller 350 conducts first DC 203 from PV cell 110 directly through low voltage junction 305 to dedicated circuit 102 when DC power at a threshold voltage is generated by PV cell 110.

Figure 3:
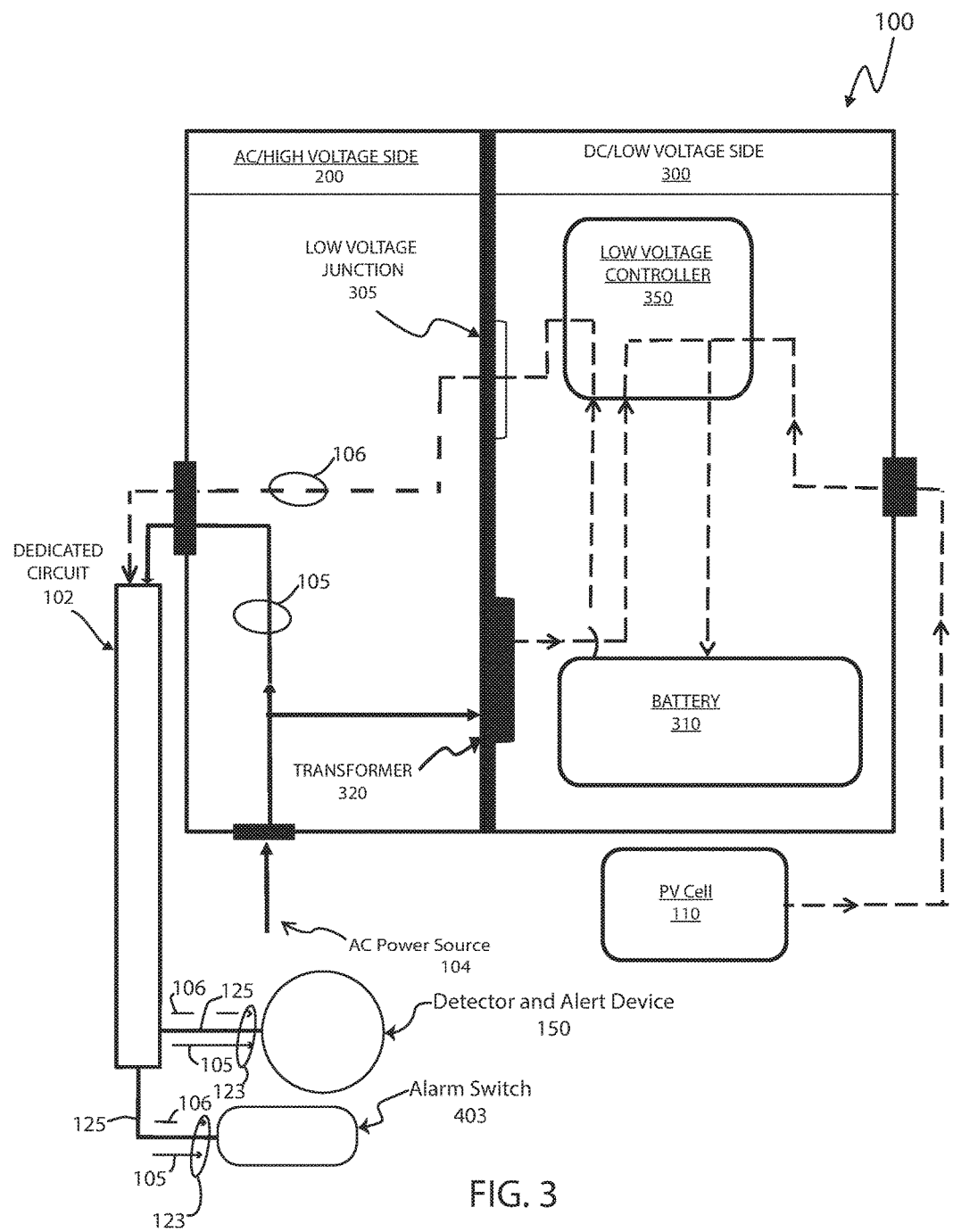
FIG. 3 is a schematic view of a battery interconnected alert device system 100.

FIG. 3 shows an example embodiment of alarm device system with simultaneous AC/DC power source 100. FIG. 3 shows all the elements of system 100 shown in FIG. 2 with the addition of an alarm switch 403 electrically coupled to dedicated circuit 102 by conductor 125. Electrically coupling a plurality of alarm devices 150 to dedicated circuit 102 on a corresponding plurality of conductors 125 interconnects alarm devices 150 and electrically couples alarm devices 150 to low voltage controller 350. Coupling enables low voltage controller 350 to activate some or all alert devices 150 electrically coupled to dedicated circuit 102 by conductors 125 in response to activation of a single detection and alert device 150, in some embodiments. In some embodiments, an alarm switch 403 is electrically coupled to dedicated circuit 102, as also shown by FIG. 3. In some embodiments of alarm device system 100 comprising alarm switch 403, activation of alarm switch 403 causes simultaneous activation of all or a plurality of alarm devices 150 by low voltage controller 350.

In some embodiments, alarm switch 403 is electrically coupled to dedicated circuit 102, wherein manual activation of alarm switch 403 causes activation of alarm device system with simultaneous AC/DC power source 100, similar to activation by detection and alert device 150. Alarm switch 403 allows for manual activation of system 100 by an occupant of a building structure wherein system alert device 150 is installed, causing alert device 150 to be activated.

Figure 4:
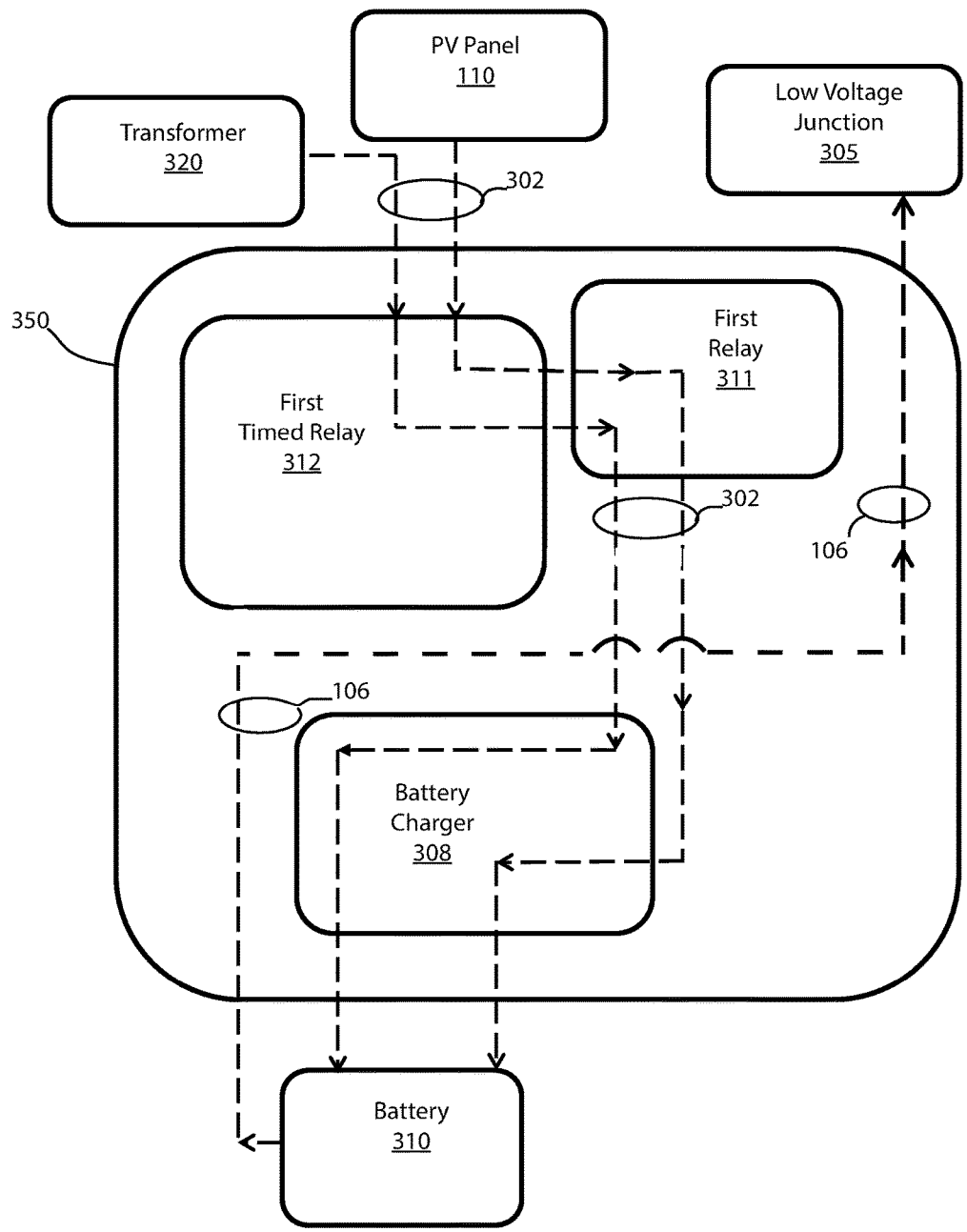
FIG. 4 is a schematic view of a low voltage controller 350 of a battery interconnected alert device system 100.

FIG. 4 shows a detailed schematic representation of an example embodiment of low voltage controller 350. Low voltage controller 350 has two functions. First, low voltage controller 350 functions to direct a charging second direct current 302 to battery 310 via a battery charger 308 by choosing from a plurality of second direct currents 302, in some embodiments. In some embodiments, second direct current 302 comprises AC power source 104 modified by transformer 320, such as to rectify an AC current to a DC current, and to either increase or decrease the voltage of the DC current. In some embodiments, second DC source 302 comprises PV panel 110. In still other embodiments, second direct current 302 comprises a wind turbine, other renewable DC source, or other DC source not described herein. Any combination of one, two, three, or more than three second direct currents 302 are electrically coupled to low voltage controller 350 in various embodiments of the invention. Second, low voltage controller 350 functions to route first direct current 106 from battery 310 directly to low voltage junction 305.

In the example embodiment shown in FIG. 4, low voltage controller 350 comprises first relay 311, first timed relay 312, and battery charger 308. Battery charger 308, in some embodiments, comprises a commercially available DC battery charger/inverter which uses DC current from PV panel 110, or AC current from transformer 320 (changed to DC current by the inverter). Low voltage controller 350 is electrically coupled to battery 310, transformer 320, and/or PV panel 110. This arrangement is not meant to be limiting. Any number and combination of electrical/electronic devices can be assembled to perform the two functions disclosed herein above. For example, low voltage controller 350 may simply comprise a unitary solid state device such as a commercially available DC-DC power management integrated circuit known in the art.

In the embodiment shown in FIG. 4, battery 310 is electrically coupled to first timed relay 312 of low voltage controller 350. First timed relay 312, in some embodiments, allows a time interval for residual charge present in capacitors and the like within low voltage controller 350 and battery charger 308 to discharge prior to re-energizing with second DC 302 from an alternative source of second DC 302. In some embodiments, first timed relay 312 is electrically interposed between battery 310 and first relay 311 and creates a timed delay between termination of DC power from transformer 320 and transmission of DC power from battery 310 to first relay 311 (connection not shown in FIG. 4). In some embodiments, first timed relay 312 creates about a one second delay between arrival of DC from battery 310 and provision of DC to first relay 311. In some embodiments, the delay is between about 500 milliseconds and about one second. In some embodiments, the delay is shorter than about 500 milliseconds. In some embodiments, the delay is longer than about one second. First timed relay 312 may be selected from mechanical or solid-state relays that are commercially available and known to those with skill in the art. In some embodiments (not shown), first timed relay 312 is not present and battery 310 is electrically coupled directly to first relay 311. Some embodiments of alarm device system with simultaneous AC/DC power source 100 do not comprise first timed relay 312. Some embodiments, alarm device system with simultaneous AC/DC power source 100 comprises neither first timed relay 312 nor first relay 311.

When no AC power source 104 is available, DC power from battery 310 is routed through low voltage junction 305 to AC/high voltage side 200 (See FIG. 1.) Alternatively, when AC power source 104 is available and energizes dedicated circuit 102 with AC power, DC power from battery 310 provides first DC 106 creating composite AC/DC power as composite current 123.

Figure 5:
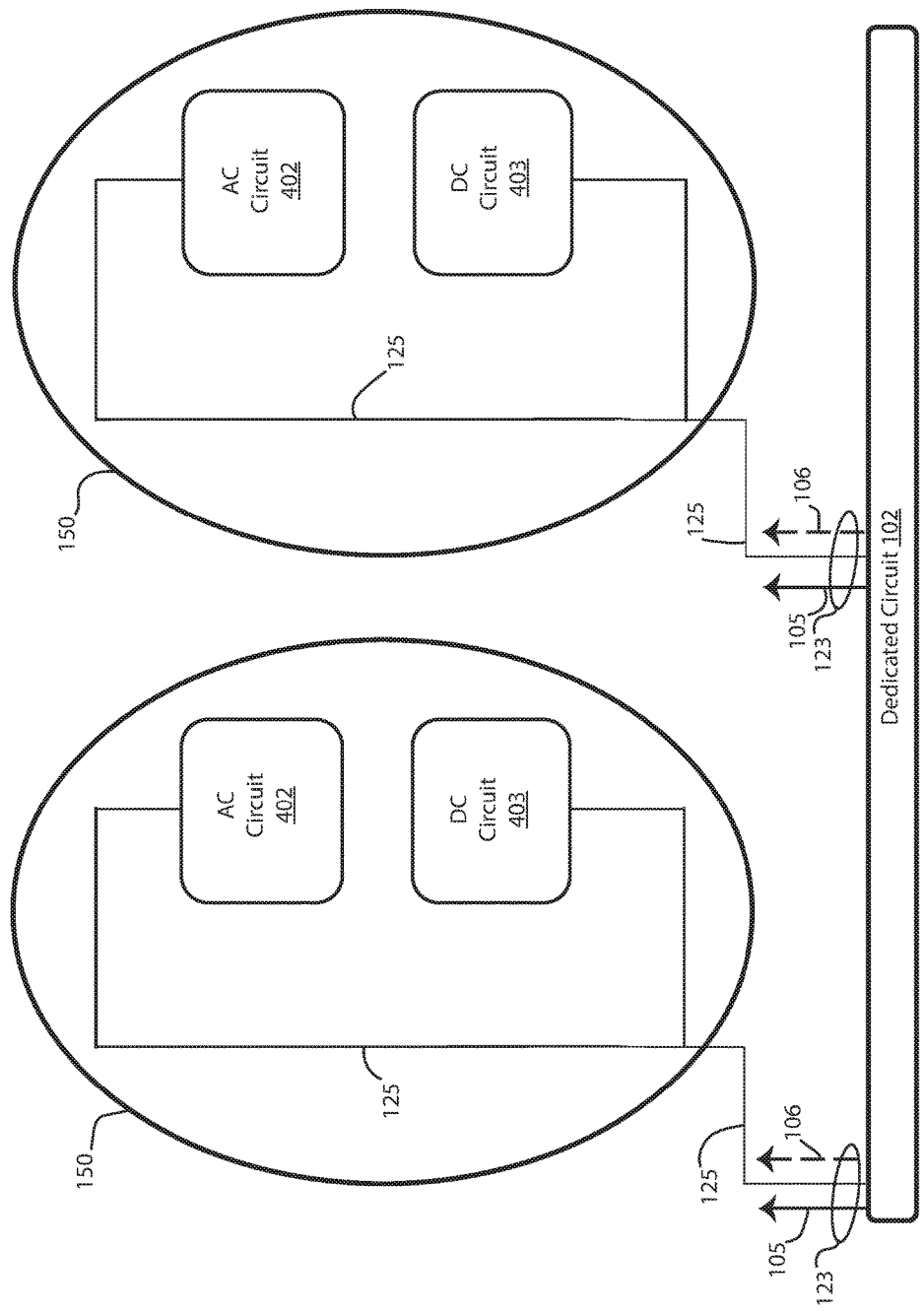
FIG. 5 is a schematic representation of two battery interconnected alert devices 150 electrically coupled to dedicated circuit 102.

FIG. 5 shows a schematic representation of two alert devices 150 electrically coupled to dedicated circuit 102. This illustration is by example only and not meant to be limiting. One, two, three, or any number of alert devices 150 are electrically coupled to dedicated circuit 102 in some of the various embodiments of the invention. In some embodiments, detection and alert device 150 comprises an AC circuit 402 and a DC circuit 403. In such embodiments, an example of which is shown in FIG. 5, detection and alert device 150 is coupled to common conductor 125 carrying composite current 123 comprising external alternating current 105 and direct current 106.

As shown in FIG. 5, detection and alert device 150 comprises an AC circuit 402 and a DC circuit 403. FIG. 5 also shows composite current 123, which comprises a composite current from AC power source 104 (shown in FIG. 1) and first DC source 203, depending, as discussed extensively herein, upon whether AC current 105 from AC power source 104 is available. Composite current 123 flows through common conductor 125.

Figure 6:
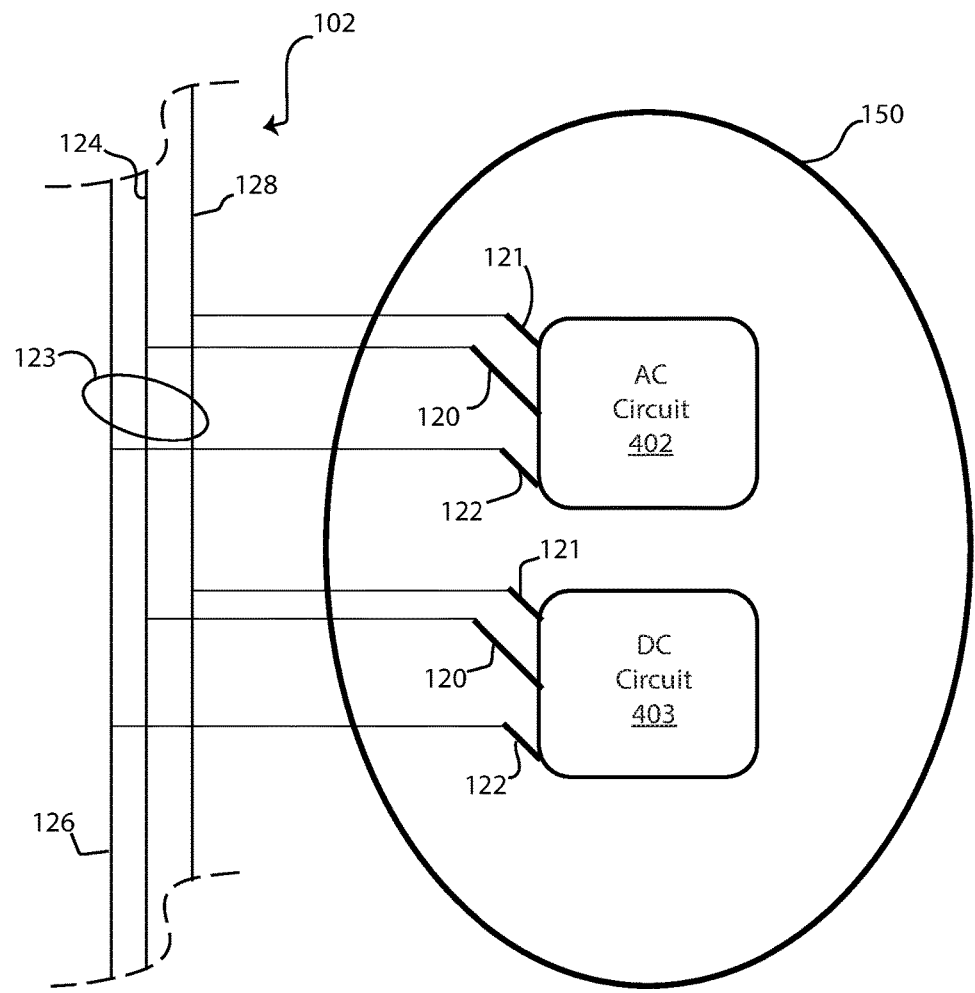
FIG. 6 is a schematic representation of wiring of a circuit comprising a composite current to an alert device 150.

FIG. 6 is a schematic representation of wiring of a circuit comprising a composite current to an alert device 150. FIG. 6 shows AC circuit 402 and DC circuit 403 electrically coupled to dedicated circuit 102 comprising a composite current 123. In some embodiments, composite current 123 is a composite AC/DC current, as discussed herein above. AC circuit 402 and DC circuit 403 are wired in parallel to dedicated circuit 102. Under a condition wherein composite current 123 comprises AC, AC circuit 402 powers voltage loads of alert device 150, such as detectors, alerts including auditory, visual, and vibrational alerts; and light indicators, for example. Under a condition wherein AC is absent, DC circuit 403 powers the voltage loads of alert device 150. In some embodiments, AC circuit 402 comprises an AC to DC rectifier. It is to be understood that many circuit configurations and electrical couplings are possible to create embodiments of alert device 150 wherein either an incoming AC from dedicated circuit 102 or a DC from dedicated circuit 102 is used, whether modified or un-modified, to voltage loads of alert device 150.

Dedicated circuit 102, as shown in FIG. 6, comprises three wires, in some embodiments: a line wire 124, a neutral wire 128, and a ground wire 126. Line wire 124 is electrically coupled to line terminal 120 of AC circuit 402 and line terminal 120 of DC circuit 403, in some embodiments. Neutral wire 128 is electrically coupled to neutral terminal 121 of AC circuit 402 and neutral terminal 121 of DC circuit 403, in some embodiments. Ground wire 126 is electrically coupled to ground terminal 122 of AC circuit 402 and ground terminal 122 of DC circuit 403, in some embodiments.

Figure 7:
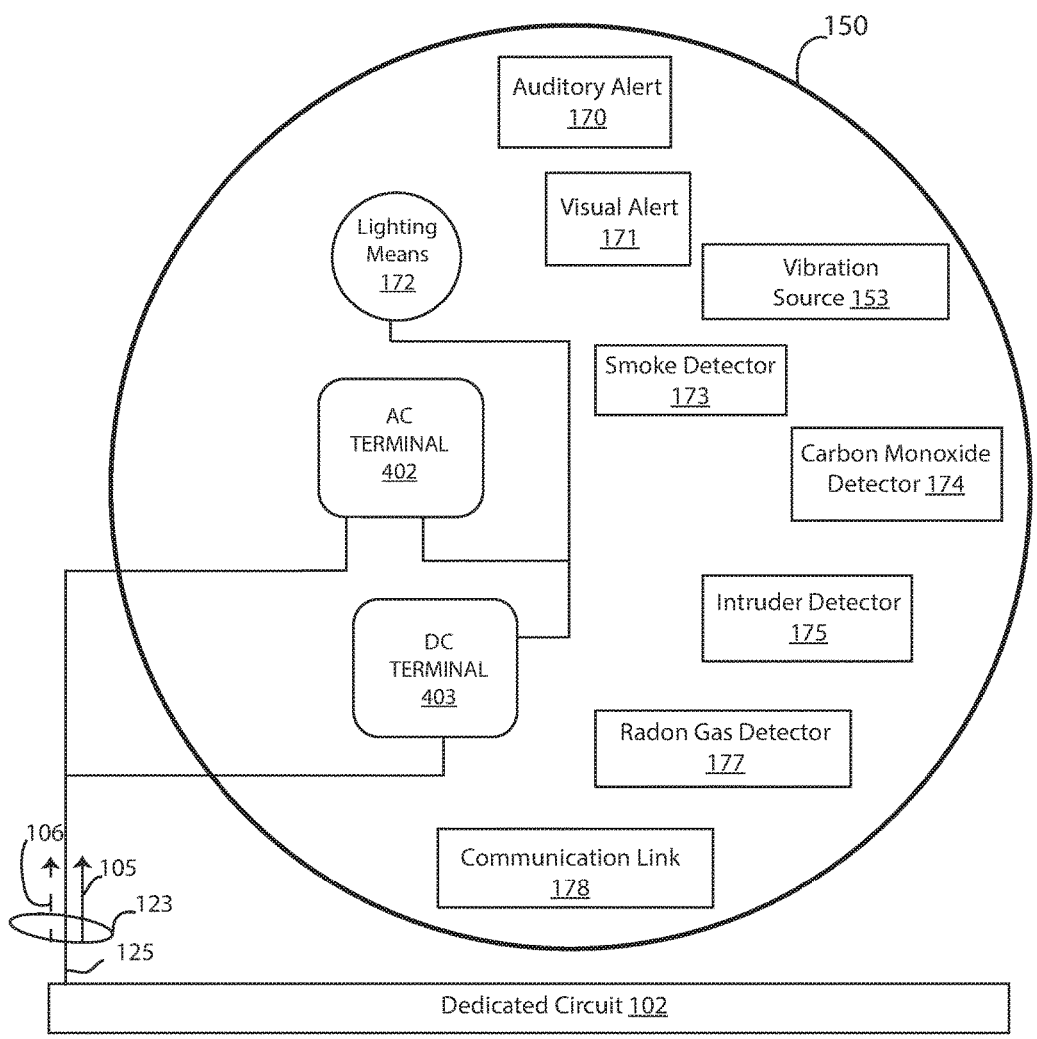
FIG. 7 is a schematic representation of a method of creating a detection and alert device system

FIG. 7 is a schematic representation of some alternative embodiments of detection and alert device 150 comprising multiple examples of possible detection and alert means. These examples are not meant to be limiting; detection and alert device 150 may comprise additional or alternative detection devices besides those examples noted in FIG. 7 and discussed herein below.

FIG. 7 shows alert device 150 comprising additional elements of alarm device system with simultaneous AC/DC power source 100, present in some embodiments. In some embodiments, alarm device system with simultaneous AC/DC power source 100 further comprises an emergency lighting system. In some embodiments, alert device 150 further comprises a lighting means 172. Lighting means 172 causes illumination of a space proximate to an individual alert device 150, in some embodiments. In some embodiments, lighting means 172 is part of an emergency lighting system. In some embodiments, lighting means 172 is electrically coupled to dedicated circuit 102 and is mounted in a separate location from alert device 150. Lighting means may be a light emitting diode, by way of example, or other suitable means of illumination. In some embodiments, detection and alert device 150 comprises a visual alert 171. Visual alert communicates the presence of a condition, such as an emergency condition, to a person viewing visual alert 171. Visual alert 171 is distinguished from lighting means 172 in that visual alert 171, although visible to a person in a space, does not necessarily illuminate the space, wherein lighting means 172 does illuminate the space at a sufficient level for a person present in the space to safely exit the space, if necessary. Some non-limiting examples of visual alerts include a light source, such as a light-emitting diode, which is activated with activation of detection and alert device 150. In some embodiments, visual alert 171 is a flashing light. In some embodiments, visual alert 171 flashes in a pattern synchronous with pulsed vibrations caused by vibration source 153. In some embodiments, visual alert 171 flashes in a pattern asynchronous with vibrations caused by vibration source 153.

In some embodiments, detection and alert device 150 comprises a smoke detector 173, such as a conventional smoke detection device. In some embodiments, detection and alert device 150 comprises an auditory alert 170, such as an audible tone; carbon monoxide detector 174, such as a conventional carbon monoxide detection device. In some embodiments, detection and alert device 150 comprises an intruder detector 175, such as a conventional motion detector or alternative intruder detection device. In some embodiments, detection and alert device 150 comprises a radon gas detector 177, such as a conventional radon gas detection device.

In some or all these embodiments, alarm device system with simultaneous AC/DC power source 100 comprises a detection device, such as one of the aforementioned non-limiting examples of detection devices, to trigger a vibrational alert by activation of vibration source 153. Activation of vibration source 153 transmits a vibration to a building structure and alerts a person in contact with the building structure to the existence of a possible emergency condition. Vibration source 153, in some embodiments, is coupled to the building structure through a mounting means. In some embodiments, alert device 150 is mounted on a conventional electrical junction box contained with a ceiling, a wall, or another component of the building structure. Vibrations arising from vibration source 153 are transmitted through alert device 150 via the mounting means to the ceiling, wall, or other building structure component throughout structural components of the building structure in physical continuity with alert device 150's location.

The effectiveness of the vibrations in waking a sleeping person is increased when the vibrations are intermittent and alternating with periods of no vibration, such as pulsed vibrations. Moreover, alert device 150, in some embodiments, uses a pattern of pulsed vibrations to communicate the nature of an emergency situation to the person, and also to communicate at least simple instructions, such as remain in the room, immediately exit the building, etc. In some embodiments, a standardized language of patterned pulsed vibrations is used to communicate the nature of an emergency. In some embodiments, the standardized language is used to communicate instructions to a person.

In some embodiments, detection and alert device 150 comprises a communication link 178. Communication link 178 activates alert device 150, in some embodiments, when instructed to do so by a government public safety warning system, such as the Public Alert and Warning System operated by the United States Department of Homeland Security, for example. In some embodiments, communication link 178 is a wireless communication link. In some embodiments, communication link 178 is a wired communication link. In some embodiments, communication link 178 is activated by the NOAA Weather Radio All Hazards alert system. In some embodiments, other federal, state, and municipal government alert systems activate alert device 150 through communication link 178.

Figure 8:
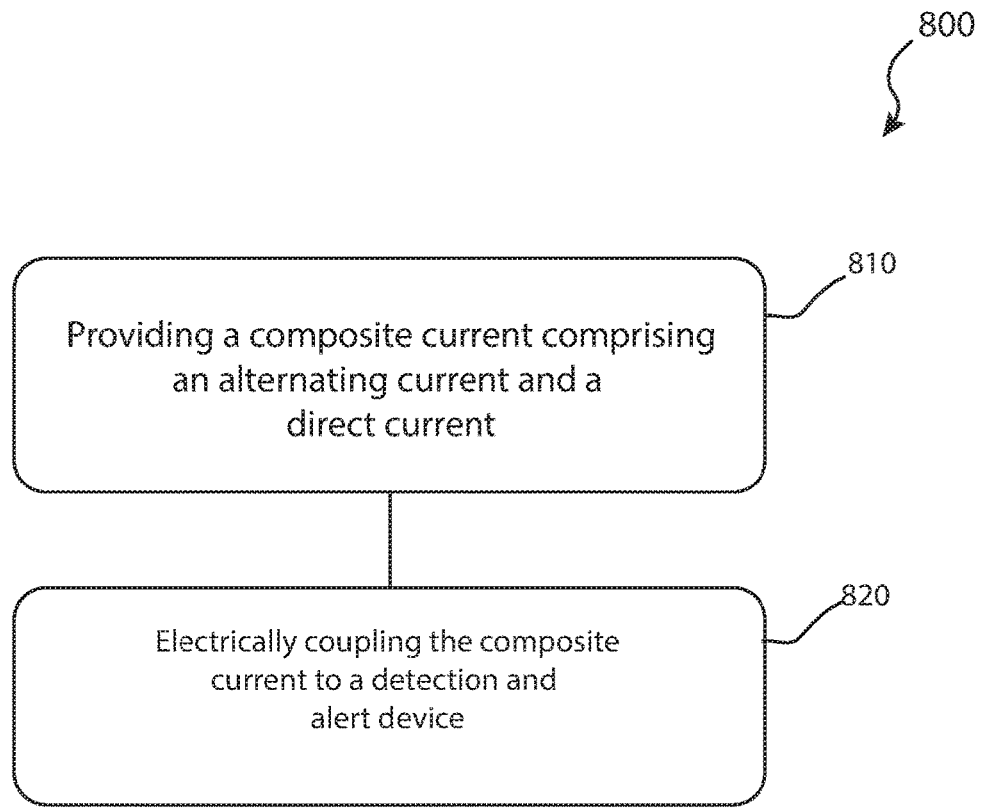
FIG. 8 is a schematic diagram of a method of powering an alarm device system with simultaneous AC/DC power source.

FIG. 8 is a schematic diagram of a method of powering an alarm device system with simultaneous AC/DC power source. FIG. 8 shows a method 800 comprising a providing step 810 and a coupling step 820. Providing step 810 comprises providing a composite current comprising an alternating current and a direct current. The composite current, in some embodiments, comprises a line AC superimposed upon a DC from a DC source, such as a battery. Under a condition wherein the AC is interrupted or discontinued, the DC provides backup power to energize detection elements and alarm elements of a detection and alert device, making possible continuous, uninterrupted function of the detection and alert device when line AC is absent. Coupling step 820, in some embodiments, comprises electrically coupling the composite current to a detection and alert device.

In some embodiments, coupling step 820 is accomplished by electrically coupling a line wire of a dedicated circuit to line terminals of an AC circuit and DC circuit; a neutral wire of a dedicated circuit to neutral terminals of an AC circuit and DC circuit; and a ground wire of a dedicated circuit to ground terminals of an AC circuit and DC circuit of a detection and alert device.

An alarm device system with simultaneous AC/DC power source has been described. The alarm device system described herein provides a means for continuous, reliable DC backup of an interconnected network of alert devices in a building by locating a DC battery in a location convenient to the user, and, in some embodiments, by providing a means to continuously or intermittently recharge a rechargeable battery and providing AC and continuous backup DC to detection and alert devices through a composite alternating and direct current on a dedicated circuit. It is to be understood that the embodiments of the alarm device system with simultaneous AC/DC power according to the invention as shown and described is an example only and that many other embodiments of the alarm device system with simultaneous AC/DC power according to the invention are possible and envisioned.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An alarm device system comprising:
   an alarm device electrically coupled to a dedicated circuit;
   an alternating current source coupled to the dedicated circuit;
   a rechargeable battery located remote from the alarm device coupled to the dedicated circuit; wherein the dedicated circuit conducts a composite current comprising the rechargeable battery and an alternating current from the alternating current source to the alarm device via a single conductor; and
   a low voltage controller electrically coupled between the rechargeable battery and the dedicated circuit, comprising a first relay electrically coupled to the rechargeable battery and a plurality of second direct current sources, wherein the first relay conducts the charging current to the rechargeable battery by selecting from a plurality of second direct current sources; and
   a second direct current source coupled to the low voltage controller, wherein the low voltage controller conducts a charging current to the rechargeable battery by selecting the second direct current source.

2. The alarm device system of claim 1, further comprising:
   an alternating current to direct current transformer electrically coupled to the alternating current source and the low voltage controller, wherein the second direct current source is the transformer.

3. The alarm device system of claim 1, wherein the plurality of second direct current sources comprises the photovoltaic cell and an alternating to direct current transformer electrically coupled to the alternating current source and the low voltage controller.

4. The alarm device system of claim 1 further comprising a plurality of alarm devices electrically coupled to the dedicated circuit, wherein the low voltage controller responds to one activated alarm device by activating the plurality of alarm devices.

5. The alarm device system of claim 1, further comprising a system panel electrically interposed between a service entrance panel and the dedicated circuit.

6. The alarm device system of claim 1, wherein the alarm device is coupled to a fire alarm.

* * * * *